Feb. 21, 1956 J. F. BLACKBURN ET AL 2,735,299
FLOWMETER
Filed April 22, 1952

INVENTORS
JOHN F. BLACKBURN
SHIH-YING LEE
BY Kenway, Jenney, Witter
& Hildreth,
ATTORNEYS

United States Patent Office 2,735,299
Patented Feb. 21, 1956

2,735,299

FLOWMETER

John F. Blackburn, Belmont, and Shih-ying Lee, Watertown, Mass., assignors, by mesne assignments, to the United States of America Application April 22, 1952, Serial No. 283,730

8 Claims. (Cl. 73—228)

The present invention relates to apparatus for measuring rates of flow of incompressible fluids, and is concerned more particularly with a flow meter having a substantially linear response over a relatively wide range of flow rates.

The flow meter of the present invention is of the type that employs an orifice which varies in size in accordance with the flow rate. While variable-orifice flowmeters are known in the art, the apparatus of the present invention, unlike prior devices, is constructed and arranged to operate with high precision to provide a substantially linear response over an extremely wide range of flow rates. Also, existing devices have generally not been capable of mounting in any position, nor suited to remote indication, nor, in some instances, to operation under the extremely high pressures apt to be encountered in hydraulic apparatus and in various chemical processes.

It is, accordingly, an object of the invention to provide, in a practicable instrument, a flow meter characterized by small pressure drop, high accuracy, substantially linear response over an extremely wide range of flow rates, adaptability to remote indication, and ability to operate effectively under high pressure.

In accordance with these and other objects, the invention comprehends among its several features the provision of a flow meter wherein the variable orifice is of novel construction involving special design parameters, and wherein the restoring force is derived by means acting independently of gravity, so that the instrument is not dependent on position for accurate response.

Figure 1:
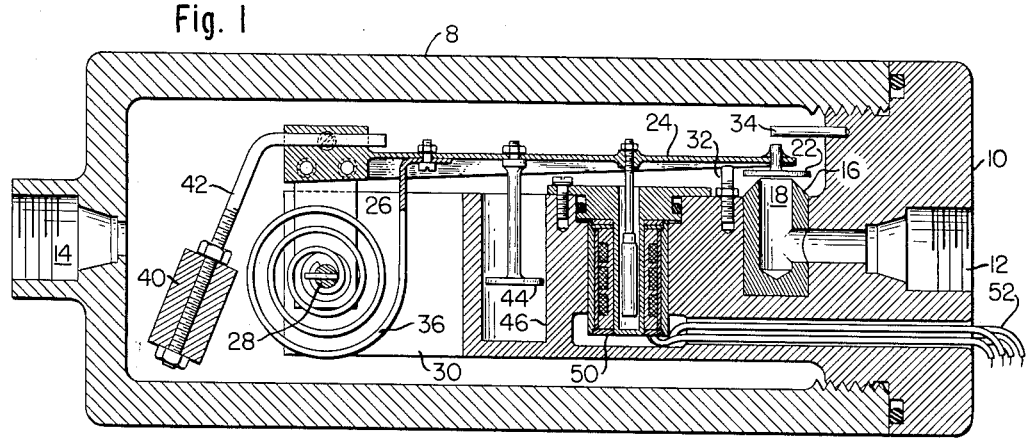
Figure 2:
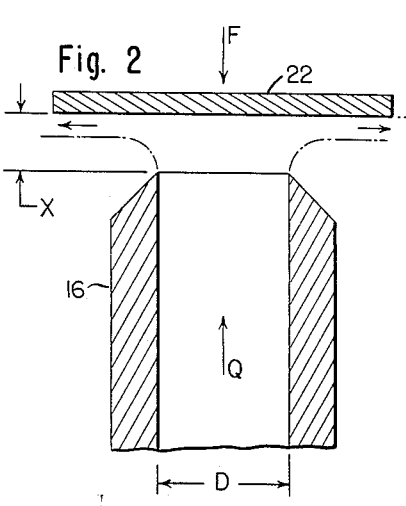
Figure 4:
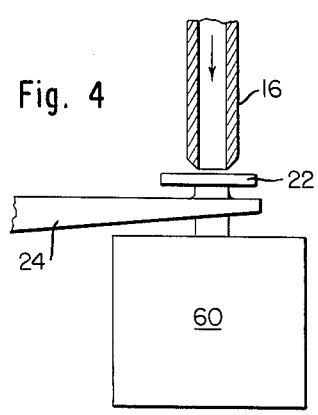
Figure 3:
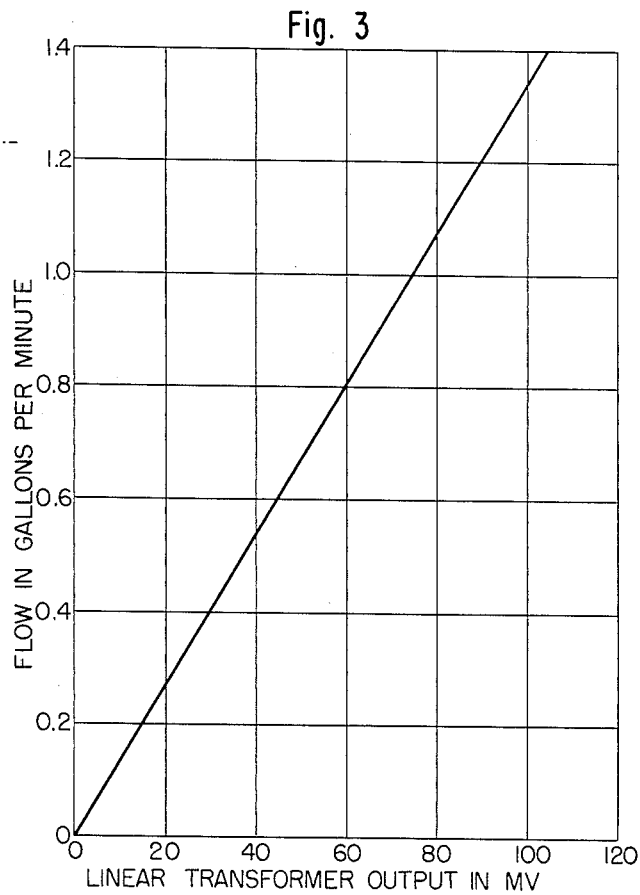

In the accompanying drawings, Fig. 1 is a view in sectional elevation of the presently preferred embodiment of the invention; Fig. 2 is an enlarged sectional detail of the orifice portion of the flowmeter, to illustrate the flow pattern and to aid in understanding the design factors governing the orifice; Fig. 3 is a graphical plot illustrating the performance of a typical instrument constructed in accordance with the invention, and Fig. 4 is a sectional detail of a modified form of orifice embodying means to render the flow readings substantially independent of changes in density of fluid.

The apparatus comprises a casing 8 having a removable closure 10 at one end, on which the flow measuring elements are mounted. The closure 10 is provided with an inlet passage 12, while the casing at the other end is provided with an outlet passage 14, both passages having threaded portions to receive the usual fittings for connection into the system whose flow is to be measured.

The variable orifice of the meter comprises a nozzle 16 mounted in the inwardly projecting body of the closure 10 and having its central passage 18 in communication with the inlet passage 12. At its discharge end, the outer walls of the nozzle body taper inwardly to intersect the nozzle bore at an acute angle, thus forming a sharp edge, and the nozzle is preferably formed of hard material such as hardened steel in order that this nozzle edge may remain sharp in use.

Cooperating with the sharp-edged orifice of the nozzle is a plate 22 which is capable of limited movement toward and away from the nozzle orifice. The plate is of somewhat greater diameter than the nozzle passage in order to divert the flow to a direction approximately 90° from its flow within the nozzle, as shown in Fig. 2 and as will be more fully described in the theoretical discussion to follow.

The plate is secured, as by soldering, to the end of an arm 24 secured to a short bracket 26 freely pivoted on cross-shaft 28 carried by walls 30 at the inner end of the extension of closure 10. Because of the limited range of movement of the plate relative to the length of the radius arm, the plate remains substantially normal to the axis of the nozzle orifice over the operating range. Stop screw 32 permits accurate adjustment of the arm to allow the plate, under no-flow conditions, to come into close proximity to the sharp edge of the orifice, without actually touching the same, with opening movement of the plate limited by stop 34 to a relatively small range, for reasons to be described.

To provide the slight but substantially constant restoring force required for proper operation, a helical spring 36 surrounds the pivot shaft 28, one end of the spring being secured to the shaft while the other end is secured to the arm. By employing several convolutions of appreciable radius, the total effective length of the spring may be made such that the force varies but slightly over the small range of rocking movement of the arm.

To permit the device to operate properly in any position, unaffected by gravity, the arm is counterbalanced by a weight 40 carried by a rod 42 extending from the pivot end of arm 24. By adjustment of the rod in or out of its socket in the arm, and by adjustment of the weight up or down along the threaded portion of the rod, the weight 40 may be brought to a position where the center of gravity of the whole pivotally mounted assembly may be caused to coincide with the pivotal axis, so as to attain a balanced condition for all attitudes of the device.

While appreciable damping is provided by reason of the immersion of the moving parts within the fluid present in the device, additional damping may be provided, if desired, by means of a dashpot comprising a piston 44 carried by the arm and operating in a cylinder 46 formed in the fixed body of the device. The clearance between the piston and the cylinder determines the degree of damping provided by the dashpot.

To provide accurate indication of the plate spacing from the nozzle, the position of the arm is preferably determined by electrical indicating means disposed externally of the meter itself. For the sensing element, a transducer of the electromagnetic type is suitable, such as a linear transformer indicated generally at 50. Such transformer is of conventional design, comprising an armature or slug connected to the arm 24 and movable axially relative to fixed coils connected by leads 52 to appropriate indicating apparatus. Alternatively, transducers of other types may be employed, provided they give rise to relatively slight reaction on the arm during operation. The center coil is connected to a source of alternating current, preferably somewhat higher in frequency than standard 60 cycle current in order to improve the speed of response of the indicating means to transient flow conditions in the flow meter. When the armature is in the neutral position, the currents induced in the outer coils are equal, while movement of the armature from zero gives rise to an unbalance in the induced current, and such unbalance may be detected and measured in the usual manner. Over the slight range of movement imparted to the armature from the null position, the indicated output of the transducer is essentially linear with respect to spacing between plate and nozzle.

In the operation of the device, the fluid enters the inlet 12 and flows through the nozzle to impinge on the flat surface of the plate 22, causing the plate to move to a position where the restoring force exactly balances the force tending to open the orifice. Since the instrument is capable of accurate response even though the restoring force is slight, there is but little tendency to impede the flow of fluid, and the pressure drop is inconsequential. Any tendency of the arm to oscillate is effectively damped by the surrounding fluid within the housing, as well as by the action of the dashpot.

A typical performance curve for a representative device is shown in Fig. 3. The flow rate was varied from zero up to 1.4 gallons per minute, and the rate plotted against the measured output voltage from the linear transformer, such voltage corresponding linearly to the spacing of the flapper plate 22 from the nozzle edge. It is seen that the signal versus flow rate plot is, as closely as can be determined, a straight line extending through zero. Even for points corresponding to flow rates as low as 0.01 gallon per minute, and below, the points lie substantially on the same straight line, indicating a linear response for ranges well in excess of 100 to 1, and it is contemplated that a linear response over a range of flow rates of the order of 1000 to 1 is entirely feasible. In addition, it has been found that the response of the instrument to sudden changes in flow is extremely rapid, so that fluctuations up to the order of 100 cycles per second may be followed.

To prevent the possibility of damage to the instrument in case a reverse flow of fluid is encountered, it may be desirable to employ a check valve in the outlet line from the instrument, to cut off any reverse flow before appreciable pressure drop can build up across the closed orifice of the meter.

As has already been indicated, the basic principle of measuring the flow of an incompressible fluid by calibrating the effective area of a variable orifice across which constant pressure drop is maintained is known in the art. However, prior attempts to utilize this principle in realizable embodiments have not been wholly successful, due to such limiting factors as slow response, restricted range of operation, and inability to operate under high pressure and in different positions.

According to the present invention, the variable orifice is provided by a flapper or movable plate, in conjunction with a sharp-edged nozzle orifice, with the parts constructed and arranged to operate in a manner which overcomes the above limitations, and permits highly satisfactory operation over a wide range of operating conditions. To show how this result is attained, it will be found helpful to consider the equations of flow that govern the operation of such a device.

The relationship between rate of flow, orifice aperture, and the force tending to close the aperture can be derived by applying Bernoulli's equation and the momentum equation as follows:

From Bernoulli's Equation $$Q = C_c x \pi D \sqrt{\frac{2\Delta P}{\rho} + v_1^2} \qquad (1)$$

$$= C_c x \pi D \sqrt{\frac{1}{\rho}(2\Delta P + v_1^2 \rho)}$$

$$= C_c x \pi D \sqrt{\frac{1}{\rho}\left(\Delta P + \frac{F}{A}\right)} \qquad (2)$$

where $Q$ = volume flow rate
$D$ = nozzle diameter
$x$ = flapper distance from closed position
$C_c$ = coefficient of contraction
$F$ = force to hold flapper in position
$\rho$ = fluid density
$\Delta P$ = difference in pressure across orifice (i. e., $P_1 - P_0$)

If we assume all the flow is changed 90° from its former course, as indicated by the flow lines in the diagrammatic view, Fig. 2, then the momentum equation is given by:

$$F = \Delta P A_1 + Q \rho V_1$$
$$= \Delta P A_1 + A_1 V_1^2 \rho$$
$$= (\Delta P + V_1^2 \rho) A_1 \qquad (3)$$
$$= \left[2\left(P_1 + \frac{v_1^2}{2}\right)\rho - \Delta P\right] A$$

where $$A_1 = \frac{D^2}{4}$$

Furthermore $$V_1 A_1 = C_c x \pi D \sqrt{\frac{2\Delta P}{\rho} + v_1^2} \qquad (4)$$

and by eliminating P and $V_1$ from the above equations $$Q = C_c x \pi D \sqrt{\frac{2}{\rho} \frac{F}{A} \frac{1}{1 + \left(\frac{4C_c x}{D}\right)^2}} \qquad (5)$$

or $$Q = \sqrt{8\pi} C_q x \left(\frac{F}{\rho}\right)^{1/2} \left[\frac{1}{1 + \left(\frac{4C_c x}{D}\right)^2}\right]^{1/2} \qquad (6)$$

It has been found by experiment that the coefficients $C_c$ and $C_q$ are substantially constant if the edge of the nozzle is sharp, to minimize viscosity effects, and the opening distance $x$ of the flapper is small relative to D. For the general configuration of parts shown in Fig. 2, $C_c$ may be taken as 0.62. Equation 6 shows that for any given density of fluid the rate of flow is a linear function of $x$ if the restoring force F is constant and provided $x$ is so small compared with D that the bracketed term in Equation 6 becomes unity. This is true only for $x=0$, or no opening of the valve orifice.

The departure from linearity is nevertheless very slight provided $x$ is made small relative to D. For example, if $$x_{max} = \frac{D}{10}$$

the bracketed term of Equation 6 becomes 0.97 and the maximum error due to this term is approximately 3% compared with the theoretical ideal. This error may be substantially minimized, however, by suitable design of the spring that provides the restoring force. Thus, even though the force F is produced by a long spring having a large initial displacement compared with $x$, nevertheless F is not actually a constant, but is equal to $F_0 + kx$ where $F_0$ is the initial force of the spring and $k$ is the spring constant. By designing the spring so that the slight increase in F as $x$ is increased is substantially equal to the increase of $$1 + \frac{4C_c x^2}{D}$$

in the denominator of the bracketed term of Equation 6, the error may be substantially eliminated. It is preferable, in any event, however, to limit the maximum flapper opening, $x_{max}$, to about 1/8 D, although for less accurate work $x_{max}$ may be allowed to reach 1/5 D. If desired, the stop 34 may be set to limit the movement of the plate to a particular range depending on the accuracy required.

The spring stiffness will be relatively small for apparatus intended for measurement at low rates with low pressure drop, in which case practically all the restoring force is derived from the action of the fluid on the flapper. On the other hand, it is possible to employ a spring of somewhat greater stiffness, to provide a wider range of measurement. This, however, is at the expense of a greater pressure drop across the instrument.

It will be observed from Equation 6 that the substantially linear response of the apparatus is dependent on the density of the fluid remaining constant. That is, the flow rate is a function of F/ρ. As a result, a correction factor must be applied when the device is used with fluids of density different from that for which the instrument is designed. Alternatively, the spring tension may be adjusted to provide correct reading for the new density of fluid.

It is possible, however, to modify the instrument so that it will provide correct readings independent of density variations. Such an instrument constitutes a true-volume rate flow meter, which possesses distinct utility for certain types of applications. This embodiment differs only slightly from the apparatus shown in Fig. 1, the principal difference being shown in the detail view, Fig. 4. The apparatus is mounted in such a position that the nozzle orifice is directed downwardly in a vertical direction, and the flapper plate on arm 24 thus is forced downwardly by the fluid flow away from the orifice. Instead of relying on a helical spring 36 or its equivalent for the restoring force, a small float 60 is mounted on the arm beneath the plate. Upon proper adjustment of the counterweight to balance out the weight of the arm, plate, and float in the absence of fluid in the housing, the force tending to hold the plate closed will be proportional to the density of the fluid flowing through the meter. As a result, the ratio of F/ρ will remain constant in spite of variations in fluid density, and the flow rate will be given in terms of plate spacing from the orifice edge, independently of density. It must be noted, however, that the apparatus is rendered dependent on position by the use of the density-responsive float, since the component of force derived from the float should extend substantially vertically.

While the invention has been described as embodied in a particular form and arrangement, it will be understood that this is for purposes of illustration only, and that the invention is not to be limited thereby, but comprehends other arrangements and configurations within the scope of the appended claims.

We claim:

1. A flowmeter comprising a casing having a chamber within, inlet and outlet passages for said chamber, a nozzle connected to the inlet passage and discharging into the chamber, said nozzle having its downstream end outer walls tapered inwardly to intersect the nozzle bore at an acute angle so as to terminate the nozzle with a sharp edge, a plate larger in area than the cross-sectional area of the nozzle, said plate being mounted in a plane substantially normal to the nozzle axis and movable toward and away from the nozzle in response to variations in fluid flow therethrough to provide a variable orifice between the plate and the sharp edge of the nozzle, a spring for urging the plate toward the nozzle with substantially constant force over the range of movement of the plate, counterbalance means connected with the plate to render the restoring force on the plate substantially independent of gravity, means for indicating the spacing between plate and nozzle upon the flow of fluid therebetween, and means for limiting the movement of the plate from the nozzle to a distance approximately one-eighth the diameter of the nozzle to provide a substantially linear relation between fluid flow rate and orifice opening.

2. A flowmeter comprising a casing having a chamber within, inlet and outlet passages for said chamber, a nozzle connected to the inlet passage and discharging into the chamber, said nozzle having its discharge end outer walls tapered inwardly to intersect the nozzle bore at an acute angle so as to terminate the nozzle with a sharp edge, a narm pivotally mounted within the chamber for rocking movement about an axis remote from the nozzle, a plate mounted on said arm substantially normal to the nozzle axis and movable toward and from the nozzle in response to variations in fluid flow therethrough, means acting on the arm to urge the plate toward the nozzle, means for indicating the spacing between the plate and the nozzle edge upon the flow of fluid therebetween, and means for limiting the movement of the plate from the nozzle to a distance approximately one-eighth the diameter of the nozzle to provide a substantially linear relation between fluid flow rate and plate spacing.

3. Flowmeter according to claim 2 wherein the means acting on the arm is a spring having substantial length and under initial stress so that the force urging the plate toward the nozzle is substantially uniform over the range of plate movement.

4. Flowmeter according to claim 2 wheerin the means for indicating plate spacing is a linear transformer having its armature connected to and positioned by the arm.

5. Flowmeter according to claim 2, wherein dashpot damping means is provided between the arm and the casing.

6. Flowmeter according to claim 2 wherein adjustable counterbalance means are provided for said arm to enable the effective center of gravity of the arm and counterweight to be brought into substantial coincidence with the pivotal axis of the arm.

7. A flowmeter comprising a casing having a chamber within, inlet and outlet passages for said chamber, a nozzle connected to the inlet passage and discharging into the chamber, said nozzle having its downstream end outer walls tapered inwardly to intersect the nozzle bore at an acute angle so as to terminate the nozzle with a sharp edge, an arm pivotally mounted within the chamber for rocking movement about an axis remote from the nozzle, a plate larger in diameter than the nozzle orifice and mounted on said arm in a plane substantially normal to the nozzle axis, a spring acting on the arm to urge the plate toward the nozzle orifice, means for limiting the movement of the arm to the range between substantially zero spacing of the plate from the nozzle and a spacing less than approximately one-eighth the nozzle diameter, a counterweight for said arm, and means for supporting the counterweight on the arm for both outward and transverse adjusting movements to enable the center of gravity of the arm and counterweight to be brought into substantial coincidence with the pivotal axis of the arm.

8. A flowmeter comprising a casing having a chamber within, inlet and outlet passages for said chamber, a nozzle connected to the inlet passage and discharging into the chamber, said nozzle having its downstream end outer walls tapered inwardly to intersect the nozzle bore at an acute angle so as to terminate the nozzle with a sharp edge, a plate substantially normal to the nozzle axis and mounted for movement toward and away from the nozzle in response to variations in fluid flow therethrough, means for urging the plate toward the nozzle, said means comprising a float connected to the plate and adapted to be immersed in the liquid within the chamber, means for limiting the movement of the plate from the nozzle to a distance approximately one-eighth the nozzle diameter, and means for indicating the spacing between the plate and the nozzle edge upon the flow of fluid therebetween.

References Cited in the file of this patent

UNITED STATES PATENTS

| Number | Name | Date |
|---|---|---|
| 965,915 | Lea | Aug. 2, 1910 |
| 1,063,255 | Hanks | June 3, 1913 |
| 1,401,887 | Davis | Dec. 27, 1921 |
| 2,268,391 | Gauthier | Dec. 30, 1941 |
| 2,325,345 | Tate | July 27, 1943 |
| 2,605,638 | Pearson | Aug. 5, 1952 |
| 2,609,831 | Macgeorge | Sept. 9, 1952 |

FOREIGN PATENTS

| 354,327 | France | Sept. 17, 1907 |